US012780321B2

(12) United States Patent
Di Sacco

(10) Patent No.: US 12,780,321 B2
(45) Date of Patent: Nov. 3, 2026

(54) CAR WITH AN INTERNAL COMBUSTION ENGINE ARRANGED IN A CENTRAL POSITION AND A REAR LUGGAGE COMPARTMENT

(71) Applicant: FERRARI S.P.A., Modena (IT)

(72) Inventor: Michele Di Sacco, Modena (IT)

(73) Assignee: FERRARI S.P.A., Modena (IT)

( * ) Notice: Subject to any disclaimer, the term of this patent is extended or adjusted under 35 U.S.C. 154(b) by 209 days.

(21) Appl. No.: 18/904,302

(22) Filed: Oct. 2, 2024

(65) Prior Publication Data

US 2025/0115305 A1 Apr. 10, 2025

(30) Foreign Application Priority Data

Oct. 4, 2023 (IT) ........................ 102023000020523

(51) Int. Cl.
*B62D 25/08* (2006.01)
*B60K 15/063* (2006.01)
(Continued)

(52) U.S. Cl.
CPC .......... *B62D 25/087* (2013.01); *B60K 15/063* (2013.01); *B62D 25/12* (2013.01); *B62D 35/007* (2013.01)

(58) Field of Classification Search
CPC ...... B62D 25/087; B62D 25/10; B62D 25/12; B62D 35/00; B62D 35/007
See application file for complete search history.

(56) References Cited

U.S. PATENT DOCUMENTS 4,384,630 A 5/1983 Steiner
2003/0075950 A1 4/2003 Rees
(Continued)

FOREIGN PATENT DOCUMENTS

CN 108583330 A 9/2018
CN 106379428 B 1/2019
KR 20200088144 A 7/2020

OTHER PUBLICATIONS

Italian Search Report for Application No. 202300020523; Filing Date: Oct. 4, 2023; Date of Mailing: Apr. 5, 2024; 7 pages.
(Continued)

*Primary Examiner* — Timothy Hannon
(74) *Attorney, Agent, or Firm* — CANTOR COLBURN LLP

(57) ABSTRACT

A car having: two front wheels; two rear wheels; a body; a passenger compartment, which is obtained inside the body between the front wheels and the rear wheels; a luggage compartment arranged in a rear position behind the passenger compartment and comprising a container which is delimited by a front wall and by a rear wall and is cup-shaped being open at the top; a hood which consists of an openable door of the body and is configured to close the container of the luggage compartment at the top; and an aerodynamic duct, which originates from an air intake obtained through the body and through which, in use, an air flow can flow. The aerodynamic duct passes through the container of the luggage compartment and partially consists of an inner volume of the container so that alternatively said inner volume of the container can be utilized to accommodate luggage or can be utilized to convey air along the aerodynamic duct.

17 Claims, 3 Drawing Sheets

(51) Int. Cl.
*B62D 25/12* (2006.01)
*B62D 35/00* (2006.01)

(56) References Cited

U.S. PATENT DOCUMENTS

| | | | | |
|---|---|---|---|---|
| 2013/0062132 | A1 | 3/2013 | Wolf | |
| 2023/0399063 | A1 * | 12/2023 | Sostaric et al. ...... | B62D 35/007 |

OTHER PUBLICATIONS

Partial European Search Report for the corresponding European Application No. 24204171, Date of Mailing: Apr. 23, 2025; 10 pages.

* cited by examiner

CAR WITH AN INTERNAL COMBUSTION ENGINE ARRANGED IN A CENTRAL POSITION AND A REAR LUGGAGE COMPARTMENT

CROSS-REFERENCE TO RELATED APPLICATIONS

This patent application claims priority from Italian patent application no. 102023000020523 filed on Oct. 4, 2023, the entire disclosure of which is incorporated herein by reference.

TECHNICAL FIELD

The present invention relates to a high-performance sports car provided with an internal combustion engine arranged in a central position and with a rear luggage compartment.

PRIOR ART

Generally, in a high-performance sports car provided with an internal combustion engine arranged in a central position (namely, mounted inside the wheelbase of the car) only two seats are provided inside the passenger compartment, behind which seats a space (the so-called "bench") is obtained for the luggage (generally dimensioned for allowing the accommodation of a golf bag).

However, this space for the luggage is difficult to utilize (particularly for putting or removing bulky luggage such as a golf bag) since in order to access this space for the luggage it is necessary to pass over the seats which must thus necessarily have reclining backrests (increasing the cost, the complexity and the weight of the seats).

Patent application US2003075950A1 describes a car provided with an aerodynamic system which increases downforce when the car is yawed during a tail spin at high speed.

Patent application US2013062132A1 describes an intercooler for a car provided with an internal combustion engine arranged in a rear position; the intercooler comprises a radiator arranged below an extendable rear spoiler.

U.S. Pat. No. 4,384,630A describes a car provided with a system of air ducts which decrease the aerodynamic drag when moving forward and are configured to equalize the air pressure and reduce the turbulence in the areas surrounding the car; a fan actuated by the internal combustion engine (arranged in a front position) provides the air flow for equalizing the air pressure in the ducts.

Patent application CN108583330A describes an electrically driven car provided with an air duct which is intended for cooling a battery pack, has an air intake facing the front part of the body, and has an air outlet which faces the rear part of the body and is arranged lower than the air intake.

Patent CN106379428B describes an electrically driven car provided with aerodynamic ducts which reduce the aerodynamic drag when moving forward.

DESCRIPTION OF THE INVENTION

The object of the present invention is to manufacture a car which allows overcoming, in a simple and cost-effective manner, the drawbacks described above and in particular has an easily accessible space for accommodating the luggage.

According to the present invention, a car is manufactured as claimed in the appended claims.

The claims describe preferred embodiments of the present invention forming integral part of the present description.

BRIEF DESCRIPTION OF THE DRAWINGS

The present invention will now be described with reference to the accompanying drawings, which illustrate a non-limiting example embodiment thereof, wherein.

PREFERRED EMBODIMENTS OF THE INVENTION

Figure 1:
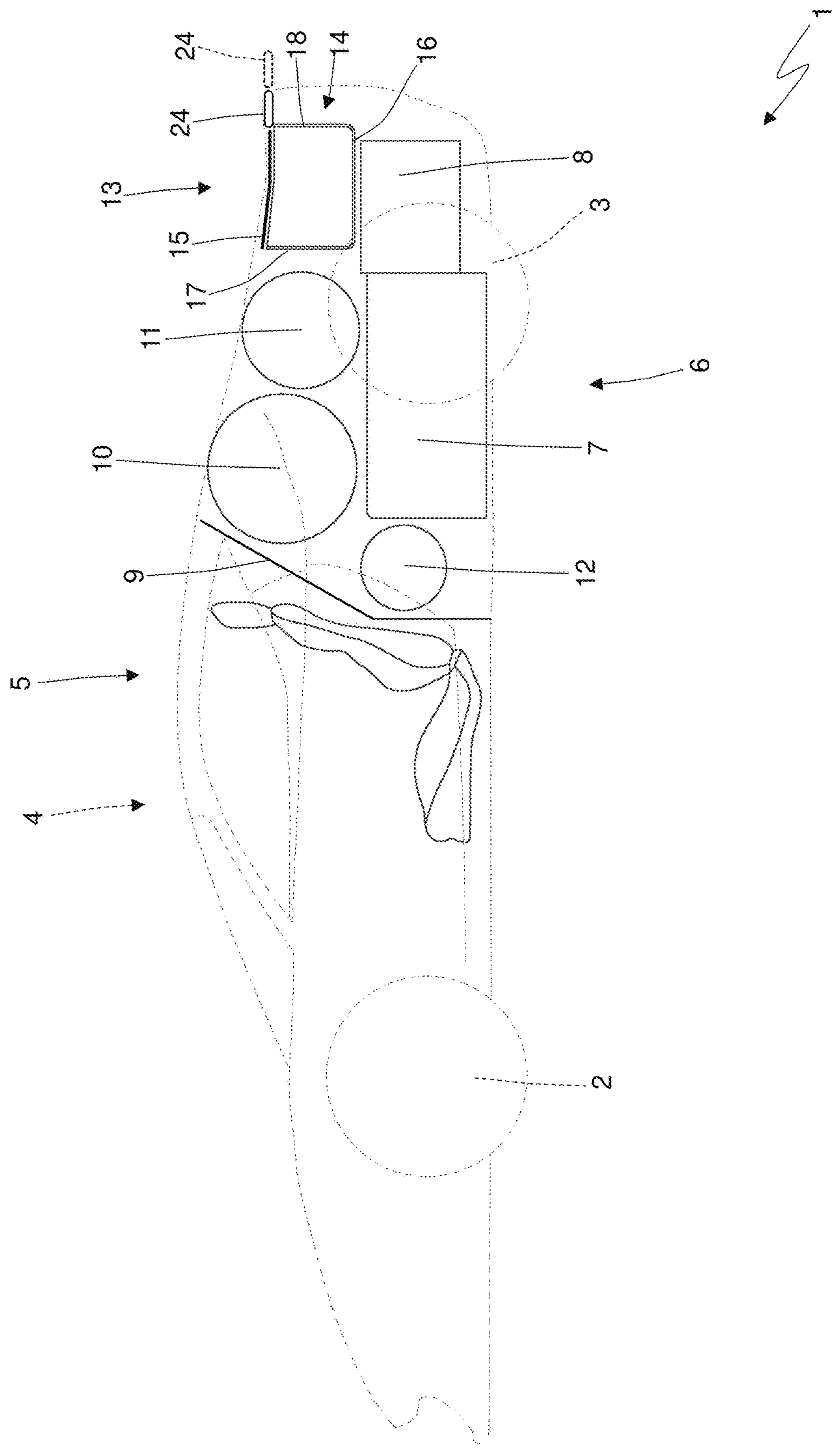
FIG. 1 is a schematic side view of a car manufactured in accordance with the present invention.

In FIG. 1, reference numeral 1 indicates, as a whole, a car comprising two front (preferably driven) wheels 2 and two rear (driving) wheels 3.

The car 1 comprises a frame which is covered by a body 4 (namely, by an outer body) which defines in the centre (namely, between the front wheels 2 and the rear wheels 3) a passenger compartment 5 which houses a pair of seats (one for the driver and one for a passenger). Furthermore, the body 4 defines at the back (namely, behind the passenger compartment 5) an engine compartment 6 in which an internal combustion engine 7 is arranged, connected to a gearbox 8 which transmits the motion to the rear driving wheels 3 by means of two axle shafts which begin from the opposite sides of a rear differential. The internal combustion engine 7 is arranged in a central position (namely, is mounted inside the wheelbase of the car 1, i.e. in the space comprised between the axis of the front wheels 2 and the axis of the rear wheels 3) and the passenger compartment 5 is arranged in front of the internal combustion engine 7 (and close to the internal combustion engine 7).

The passenger compartment 5 is separated from the engine compartment 6 by a dividing panel 9 (the so-called "firewall") which is arranged at the back of the seats; namely, the rear wall of the seats is substantially in contact with the dividing panel 9 and, therefore, behind the seats (namely, between the seats and the dividing panel 9) there is not a space that can accommodate luggage.

According to a possible embodiment, the internal combustion engine 7 is powered with hydrogen (or also another gaseous fuel). According to a different embodiment, the internal combustion engine 7 is powered with gasoline (or also another liquid fuel).

According to what is illustrated in FIG. 1, the internal combustion engine 7 is powered with hydrogen which is stored under high pressure (for example with a maximum pressure of approximately 700 bar) in three different tanks 10, 11 and 12 having a cylindrical shape.

The two tanks 10 and 11 are arranged above the internal combustion engine 7 in front of each other; in other words, the two tanks 10 and 11 (having a cylindrical shape) are arranged (approximately) at the same vertical height and are separated from each other longitudinally, i.e. are spaced apart from each other only longitudinally (namely, one is arranged in front of the other). In particular, both tanks 10 and 11 (having a cylindrical shape) are oriented transversely, i.e. their central axes of symmetry are oriented transversely. In the embodiment illustrated in FIG. 1, the tank 10 arranged at the front (namely, closer to the front) is larger than the tank 11 arranged at the back (namely, closer to the back).

The tank 12 is arranged in front of (namely, closer to the front) the internal combustion engine 7 and is thus located between the internal combustion engine 7 and the passenger compartment 5 at the back of (in contact with) the dividing panel 9.

The car 1 comprises a luggage compartment 13 which is arranged in a rear position above the powertrain system consisting of the internal combustion engine 7 and of the gearbox 8. The luggage compartment 13 comprises a cup-shaped (namely, open at the top) container 14 having an approximately parallelepiped shape, which is closed at the top by a hood 15 (namely, an openable door of the body 4 placed to protect the luggage compartment 13).

Figure 2:
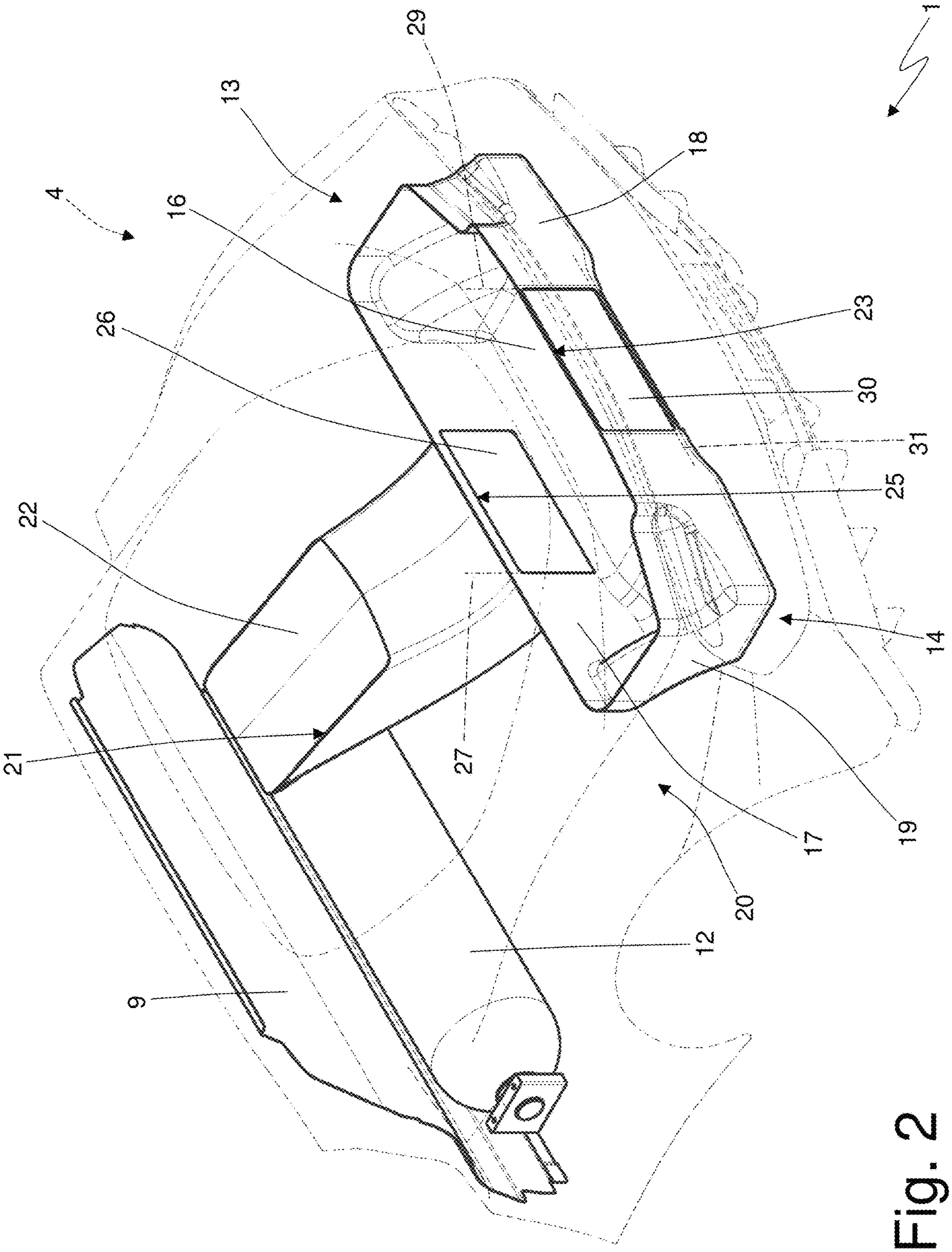
FIGS. 2 and 3 are two schematic perspective views of a rear luggage compartment of the car of FIG. 1 in a containing configuration and in an aerodynamic configuration, respectively.
Figure 3:
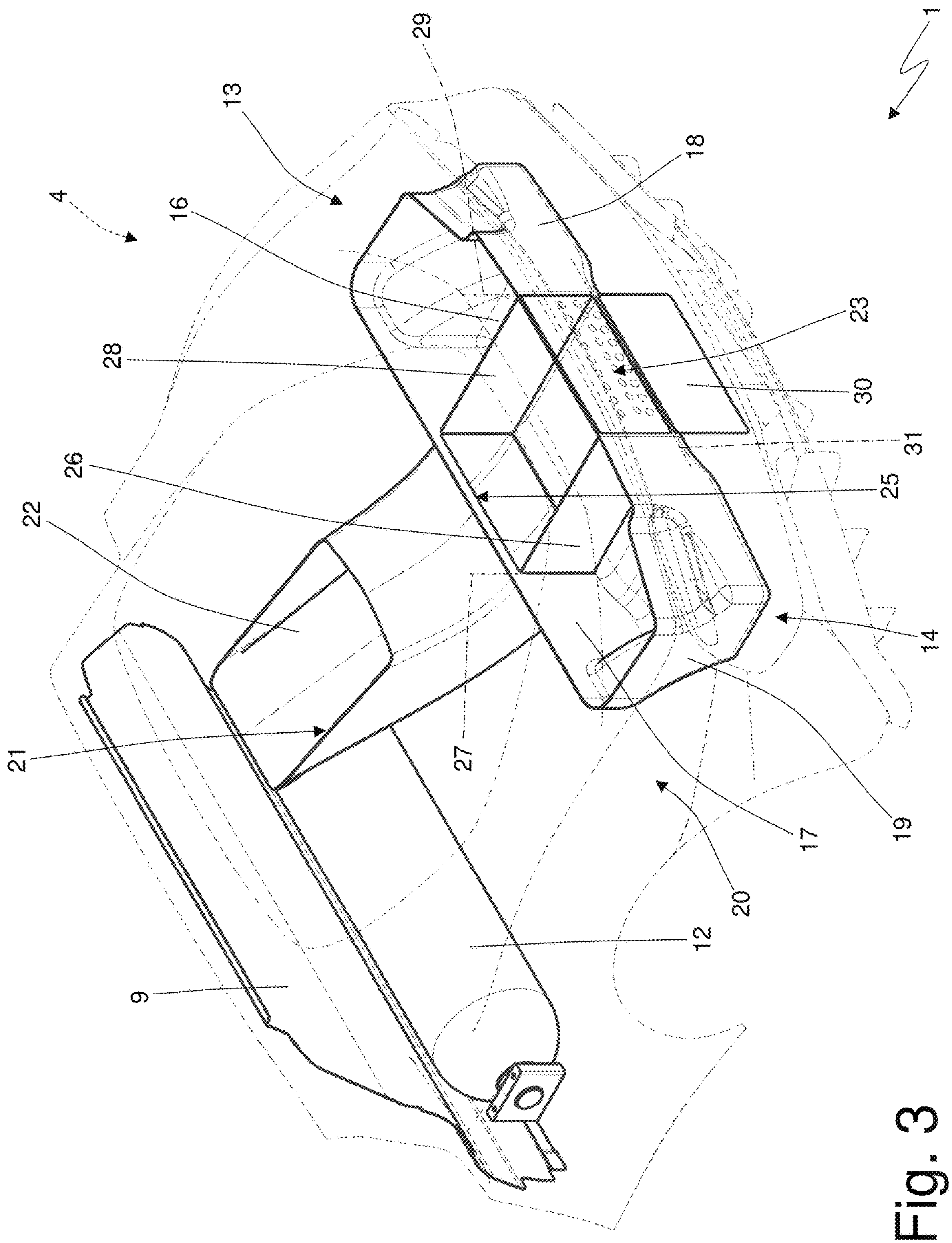

According to what is illustrated in FIGS. 2 and 3, the container 14 comprises a substantially horizontal bottom wall 16, a substantially vertical front wall 17 oriented transversely, a substantially vertical rear wall 18 oriented transversely, and two substantially vertical side walls 19 oriented longitudinally.

According to what is illustrated in FIGS. 2 and 3, the car 1 comprises an aerodynamic duct 20, which originates from an air intake 21 obtained through the body 4 and through which, in use, an air flow can flow; according to a preferred embodiment, the air intake 21 is obtained through a portion of the body 4 which is located behind a roof of the passenger compartment 5 immediately downstream of a transparent rear window (namely, of the rear windowed part).

According to a preferred embodiment, the air intake 21 is coupled to a lid 22, which is movable (preferably hinged to rotate) between an aerodynamic position (illustrated in FIG. 3), in which it leaves the air intake 21 open and thus allows an air flow to flow into the aerodynamic duct 20, and a containing position (illustrated in FIG. 2), in which it closes the air intake 21 and thus prevents an air flow from flowing into the aerodynamic duct 20.

The aerodynamic duct 20 extends from the air intake 21 to an outlet opening 23, namely the aerodynamic duct 20 ends with the outlet opening 23. According to a preferred embodiment, the outlet opening 23 of the aerodynamic duct 20 is obtained through a vertical rear portion of the body 4 arranged in the proximity of or at a rear bumper.

According to what is schematically illustrated in FIG. 1, the car 1 comprises a rear wing 24 which is arranged above the outlet opening 23 of the aerodynamic duct 20 and is configured to increase downforce, namely to increase the aerodynamic force which pushes the car 1 towards the ground increasing the grip. Preferably, the rear wing 24 is movable between a rest position (illustrated by a solid line in FIG. 1) in which the rear wing 24 is located at least partially inside the body 4 and which allows for the generation of less downforce, and a work position (illustrated by a dashed line in FIG. 1) in which the rear wing 24 is located mostly extracted from the body 4 (namely, protrudes more from the body 4 and is thus invested by a greater amount of air) which allows for the generation of more downforce.

During the travel of the car 1, the aerodynamic duct 20 can be utilized (especially when the rear wing 24 is in the rest position) for reducing the aerodynamic drag when moving forward: by blowing air through the outlet opening 23, it is possible to reduce the extension of the low pressure zone which is located behind the car 1 thereby reducing the aerodynamic drag when moving forward.

During the travel of the car 1, the aerodynamic duct 20 can be utilized (when the rear wing 24 is in the work position) for increasing downforce generated by the rear wing 24: by increasing the air flow flowing under the rear wing 24 and by reducing the air flow flowing above the rear wing 24, it is in fact possible to increase downforce generated by the rear wing 24 (in other words, the aerodynamic duct 20 "collects" air upstream of the rear wing 24 which would be essentially intended to flow above the rear wing 24 and releases it under the rear wing 24).

According to what is illustrated in FIGS. 2 and 3, the aerodynamic duct 20 passes through the container 14 of the luggage compartment 13 and partially consists of an inner volume of the container 14. In other words, an initial part of the aerodynamic duct 20 is permanent and is located upstream of the container 14 (in front of the container 14) and the final part of the aerodynamic duct 20 is created (utilized) when necessary and is located inside the container 14. Therefore, the container 14 of the luggage compartment 13 has two alternative uses: as luggage containment (when the car 1 is utilized as means of transport) and as final part of the aerodynamic duct 20 (when the car 1 is utilized for example on track for a performance driving mode).

The container 14 of the luggage compartment 13 comprises an inlet opening 25 which is connected to the initial part of the aerodynamic duct 20 and is obtained through the front wall 17 of the container 14. Furthermore, the container 14 of the luggage compartment 13 comprises the outlet opening 23 which is obtained through the rear wall 18 of the container 14 and through which the air flow coming from the initial part of the aerodynamic duct 20 flows out of the container 14. In other words, the container 14 of the luggage compartment 13 constitutes the final part of the aerodynamic duct 20 and thus the outlet opening 23 obtained through the rear wall 18 of the container 14 also constitutes the end of the aerodynamic duct 20.

A panel 26 is provided which is movable between a containing position (illustrated in FIG. 2) in which it closes the inlet opening 25, and an aerodynamic position (illustrated in FIG. 3) in which it does not close the inlet opening 25 and laterally delimits the part of the aerodynamic duct 20 which develops inside the container 14. Namely, in the aerodynamic position (illustrated in FIG. 3) the panel 26 delimits, inside the container 14 of the luggage compartment 13, a path, along which the air flow coming from the initial part of the aerodynamic duct 20 can flow. According to a preferred embodiment, the panel 26 is hinged to the front wall 17 of the container 14 so as to rotate around a vertical rotation axis 27 and in the aerodynamic position (illustrated in FIG. 3) the panel 26 is arranged perpendicularly to the front wall 17 (and to the rear wall 18) of the container 14 and extends up to the rear wall 18 of the container 14.

Similarly, a panel 28 is provided which is movable between a containing position (illustrated in FIG. 2) in which it closes the outlet opening 23, and an aerodynamic position (illustrated in FIG. 3) in which it does not close the outlet opening 23 and laterally delimits the part of the aerodynamic duct 20 which develops inside the container 14. Namely, in the aerodynamic position (illustrated in FIG. 3) the panel 28 delimits, inside the container 14 of the luggage compartment 13, a path, along which the air flow coming from the initial part of the aerodynamic duct 20 can flow. According to a preferred embodiment, the panel 28 is hinged to the rear wall 18 of the container 14 so as to rotate around a vertical rotation axis 29, and in the aerodynamic position (illustrated in FIG. 3) the panel 28 is arranged perpendicularly to the rear wall 18 (and to the front wall 17) of the container 14 and extends up to the front wall 17 of the container 14.

In other words, in the containing position (illustrated in FIG. 2) both panels 26 and 28 close the respective openings 25 and 23 and are parallel to and rest on the respective walls

17 and 18; whereas, in the aerodynamic position (illustrated in FIG. 3) both panels 26 and 28 are perpendicular to the respective walls 17 and 18 and laterally delimit the part of the aerodynamic duct 20 which develops inside the container 14.

According to a possible embodiment illustrated in the accompanying figures, a panel 30 is provided which is arranged on the outside of the container 14 of the luggage compartment 13 and is movable between a containing position (illustrated in FIG. 2) in which it closes the outlet opening 23 (on the opposite side of the panel 28) and an aerodynamic position (illustrated in FIG. 3) in which it does not close the outlet opening 23. In particular, the panel 30 is hinged so as to rotate around a horizontal rotation axis 31 between the containing position (illustrated in FIG. 2) and the aerodynamic position (illustrated in FIG. 3).

According to a preferred embodiment illustrated in the accompanying figures, the outlet opening 23 is obtained through the rear wall 18 of the container 14 and comprises a plurality of through holes which pass through the rear wall 18.

The embodiments described herein can be combined with one another without departing from the scope of protection of the present invention.

The car 1 described above has numerous advantages.

In particular, the car 1 described above has a space for accommodating the luggage (namely, the luggage compartment 13) which is relatively wide (namely, at least sufficient for accommodating a golf bag) and especially extremely convenient and simple to access.

Furthermore, the luggage compartment 13 can have two different functions depending on the use of the car 1: when the car 1 is utilized as means of transport on public roads, the luggage compartment 13 is utilized as space for accommodating luggage (as is illustrated in FIG. 2), whereas when the car 1 is utilized for a performance driving mode on track, the luggage compartment 13 (or better the central part of the luggage compartment 13) is utilized for increasing the aerodynamic efficiency and efficacy of the car 1 (as is illustrated in FIG. 3).

It is important to highlight that the arrangement of the tank 12 is optimal as it is close to the internal combustion engine 7 (namely, to the user of the fuel) and especially it is extremely protected from all possible impacts (unlike the luggage compartment 13 which however does not contain anything requiring protection in a priority manner in case of impact).

LIST OF THE REFERENCE NUMERALS OF THE FIGURES

1 car
2 front wheels
3 rear wheels
4 body
5 passenger compartment
6 engine compartment
7 internal combustion engine
8 gearbox
9 dividing panel
10 tank
11 tank
12 tank
13 luggage compartment
14 container
15 hood
16 bottom wall
17 front wall
18 rear wall
19 side walls
20 aerodynamic duct
21 air intake
22 lid
23 outlet opening
24 rear wing
25 inlet opening
26 panel
27 rotation axis
28 panel
29 rotation axis
30 panel
31 rotation axis

The invention claimed is:

1. A car (1) comprising:
two front wheels (2);
two rear wheels (3);
a body (4);
a passenger compartment (5), which is obtained inside the body (4) between the front wheels (2) and the rear wheels (3);
a luggage compartment (13) arranged in a rear position behind the passenger compartment (5) and comprising a container (14) which is delimited by a front wall (17) and by a rear wall (18) and is cup-shaped being open at the top;
a hood (15) which consists of an openable door of the body (4) and is configured to close the container (14) of the luggage compartment (13) at the top; and
an aerodynamic duct (20), which originates from an air intake (21) obtained through the body (4) and through which, in use, an air flow can flow;
wherein the aerodynamic duct (20) passes through the container (14) of the luggage compartment (13) and partially consists of an inner volume of the container (14) so that alternatively said inner volume of the container (14) can be utilized to accommodate luggage or can be utilized to convey air along the aerodynamic duct (20); and
comprising at least one panel (26, 28) which is arranged inside the container (14) of the luggage compartment (13) and is movable between a containing position in which it does not delimit said inner volume with respect to the rest of the container (14) so as to maximize the space at disposal for the luggage and an aerodynamic position in which it delimits said inner volume with respect to the rest of the container (14) so as to convey air along the aerodynamic duct (20).

2. The car (1) according to claim 1, wherein the container (14) of the luggage compartment (13) comprises at least one inlet opening (25) connected to an initial part of the aerodynamic duct (20) and at least one outlet opening (23), through which the air flow coming from the initial part of the aerodynamic duct (20) flows out of the container (14).

3. The car (1) according to claim 2 and comprising a first panel (26), which is movable between a containing position, in which it closes the inlet opening (25), and an aerodynamic position, in which it does not close the inlet opening (25).

4. The car (1) according to claim 3, wherein, in the aerodynamic position, the first panel (26) delimits, inside the container (14) of the luggage compartment (13), a path, along which the air flow coming from the initial part of the aerodynamic duct (20) can flow.

5. The car (1) according to claim 4, wherein:

the inlet opening (25) is obtained through the front wall (17) of the container (14);

the first panel (26) is hinged to the front wall (17) of the container (14) so as to rotate around a first vertical rotation axis (27); and in the aerodynamic position, the first panel (26) is arranged perpendicularly to the front wall (17) of the container (14) and extends up to the rear wall (18) of the container (14).

6. The car (1) according to claim 2 and comprising a second panel (28), which is movable between a containing position, in which it closes the outlet opening (23), and an aerodynamic position, in which it does not close the outlet opening (23).

7. The car (1) according to claim 6, wherein, in the aerodynamic position, the second panel (28) delimits, inside the container (14) of the luggage compartment (13), a path, along which the air flow coming from the initial part of the aerodynamic duct (20) can flow.

8. The car (1) according to claim 7, wherein:

the outlet opening (23) is obtained through the rear wall (18) of the container (14);

the second panel (28) is hinged to the rear wall (18) of the container (14) so as to rotate around a second vertical rotation axis (29); and in the aerodynamic position, the second panel (28) is arranged perpendicularly to the rear wall (18) of the container (14) and extends up to the front wall (17) of the container (14).

9. The car (1) according to claim 2 and comprising a third panel (30), which is arranged on the outside of the container (14) of the luggage compartment (13) and is movable between a containing position, in which it closes the outlet opening (23), and an aerodynamic position, in which it does not close the outlet opening (23).

10. The car (1) according to claim 2, wherein the outlet opening (23) is obtained through the rear wall (18) of the container (14) and comprises a plurality of through holes, which pass through the rear wall (18).

11. The car (1) according to claim 2, wherein the initial part of the aerodynamic duct (20) extends from the air intake (21) to the inlet opening (25).

12. The car (1) according to claim 2, wherein the aerodynamic duct (20) ends with the outlet opening (23).

13. The car (1) according to claim 1, wherein the air intake (21) is obtained through a portion of the body (4) located behind a roof of the passenger compartment (5).

14. The car (1) according to claim 1, wherein an outlet opening (23) of the aerodynamic duct (20) is obtained through a vertical rear portion of the body (4).

15. The car (1) according to claim 14 and comprising a rear wing (24), which is arranged above the outlet opening (23) of the aerodynamic duct (20) and is configured to increase downforce.

16. The car (1) according to claim 15, wherein the rear wing (24) is movable between a rest position, which allows for the generation of less downforce, and a work position, in which it allows for the generation of more downforce.

17. The car (1) according to claim 1, wherein the air intake (21) is coupled to a lid (22), which is movable between an aerodynamic position, in which it leaves the air intake (21) open, and a containing position, in which it closes the air intake (21).

* * * * *